United States Patent
Calia et al.

(10) Patent No.: US 12,441,419 B2
(45) Date of Patent: Oct. 14, 2025

(54) TRACKED UNDERCARRIAGE ROLLER ASSEMBLY WITH TEMPERATURE MONITORING

(71) Applicant: ITALTRACTOR ITM S.P.A, Bologna (IT)

(72) Inventors: Eustachio Calia, Matera (IT); Nicolas Moretti, Verghereto (IT)

(73) Assignee: ITALTRACTOR ITM S.P.A, Bologna (IT)

( * ) Notice: Subject to any disclaimer, the term of this patent is extended or adjusted under 35 U.S.C. 154(b) by 580 days.

(21) Appl. No.: 17/797,632

(22) PCT Filed: Feb. 5, 2021

(86) PCT No.: PCT/IB2021/050944
§ 371 (c)(1),
(2) Date: Aug. 4, 2022

(87) PCT Pub. No.: WO2021/156807
PCT Pub. Date: Aug. 12, 2021

(65) Prior Publication Data
US 2023/0150594 A1  May 18, 2023

(30) Foreign Application Priority Data
Feb. 6, 2020 (IT) .................. 102020000002371

(51) Int. Cl.
*B62D 55/32* (2006.01)
*B62D 55/088* (2006.01)
(Continued)

(52) U.S. Cl.
CPC ........... *B62D 55/32* (2013.01); *B62D 55/088* (2013.01); *B62D 55/092* (2013.01); *B62D 55/14* (2013.01)

(58) Field of Classification Search
CPC ....... B62D 55/092; B62D 55/32; B62D 55/14
See application file for complete search history.

(56) References Cited

U.S. PATENT DOCUMENTS 4,251,182 A * 2/1981 Schroeder .......... B62D 55/0887
                                                            414/723
9,371,630 B1   6/2016 Johannsen
(Continued)

FOREIGN PATENT DOCUMENTS

CN          106585753 A     4/2017
EP            3279064 A1    2/2018
(Continued)

OTHER PUBLICATIONS

International Search Report issued in International Application No. PCT/IB2021/050944, issued Apr. 21, 2021, 2 pages.
(Continued)

*Primary Examiner* — S. Joseph Morano
*Assistant Examiner* — Alex Palmer
(74) *Attorney, Agent, or Firm* — Dilworth IP, LLC

(57) ABSTRACT

A tracked undercarriage roller assembly including a roller body having a through cavity delimited by a radially inner surface, a shaft in the through cavity, a bushing extending from a first axial end to a second axial end and radially interposed between the roller body and the shaft, an annular chamber at least partially filled with a lubricant and radially interposed between the shaft and the bushing, a housing seat in the shaft including an inlet portion facing an axial end surface of the shaft and a measuring portion inside the shaft in an axial position between the first and second axial ends of the bushing, wherein the inlet portion and the measuring portion are aligned along an axial direction. A temperature transducer is inside the housing seat at the measuring
(Continued)

portion, wherein the measuring portion is at a radial distance from the bushing between 8 millimetres and 50 millimetres.

10 Claims, 5 Drawing Sheets

(51) Int. Cl.
    *B62D 55/092*    (2006.01)
    *B62D 55/14*    (2006.01)

(56) References Cited

U.S. PATENT DOCUMENTS

2013/0255354 A1    10/2013    Hawkins et al.
2017/0261450 A1*    9/2017    Baarman ................ G01N 25/72

FOREIGN PATENT DOCUMENTS

JP    2018-516806 A    6/2018
WO    2016167500 A1    10/2016

OTHER PUBLICATIONS

Office Action received for Japanese Patent Application No. 2022-547860, mailed on Feb. 13, 2025, 6 pages (3 pages of English Translation and 3 pages of Original Document).

* cited by examiner

TRACKED UNDERCARRIAGE ROLLER ASSEMBLY WITH TEMPERATURE MONITORING

FIELD OF THE INVENTION

The present invention relates to a tracked undercarriage roller assembly with temperature monitoring, namely a tracked undercarriage roller assembly whose operating temperature is monitored.

BACKGROUND

Tracked undercarriages are typically used in operating machines such as earthmoving machines, mining machines, demolition machines and the like, to allow the machine to move on often uneven ground or with poor grip.

A tracked undercarriage typically comprises two chain assemblies spaced apart and arranged parallel to each other and configured to receive a drive torque and transfer it to the ground. Each chain assembly comprises a plurality of undercarriage components which usually comprise a closed loop chain on a driving wheel and an idler wheel (or idler) operatively connected to a tensioner assembly. The undercarriage components further comprise, between the driving wheel and the idler wheel, a plurality of roller assemblies configured to guide the chain during its motion. Roller assemblies usually include one or more upper roller assemblies and a plurality of lower roller assemblies.

The chain usually comprises a plurality of links, with link it is referred to the single component of the chain which is articulated to the other components. Typically, each link comprises a pair of plates facing each other. The links are interconnected between them by pins. Each pin is usually inserted into holes provided on the plates and connects two links together.

The soles are usually mounted on the links which, being in direct contact with the ground, have the task of discharging the traction to the ground and increasing the contact surface between machine and ground. The type of sole used depends on the ground on which the machine must operate, on the conditions of the environment in which the machine must operate and on the specifications suggested by the machine manufacturer.

Each roller assembly usually comprises a roller body crossed by a shaft. The roller assembly is delimited by a radially inner surface facing the shaft, in particular facing the outer surface of the shaft. The roller body can rotate about the shaft which is fixed with respect to the undercarriage on which it is mounted. The roller assembly comprises a bushing which is fitted on the outer surface of the shaft so as to be interposed between the shaft and the inner surface of the roller body. The roller body and the shaft are made of metal, typically of steel, and the bushings are configured to reduce friction between the roller body and the shaft. The bushings are usually made of a non-ferrous material, such as bronze, or of a bi-metal alloy and are lubricated to further reduce friction between the bushing contact surfaces and roller body and/or bushing and shaft.

The undercarriage is usually subjected to very severe operating conditions which may derive from the overall weight of the machine, the high powers transferred from the engine of the machine to the ground and/or the conformation and composition of the terrain on which the machine must operate.

In particular, the Applicant has observed that in the operations for moving large earth-moving machines some undercarriage components are subjected to strong stresses. A particularly critical undercarriage component is the lower roller assembly which has the function of absorbing the loads transmitted by the machine as well as of guiding the chain. Typically, a large excavator is provided with a plurality of lower roller assemblies, for example 8 to 32. When the excavator is in motion, the lower roller assemblies are subjected to rotation with a consequent significant increase in the temperature inside the roller assemblies, which might reach critical values that can affect the functional integrity of these components.

The Applicant has noted that an unsuitable lubrication of the bushing increases friction leading to a damage of the roller assembly caused by the wear of the bushing, whose thickness gradually decreases, or to the grip of the bushing on the shaft and/or on the roller body.

The Applicant has noted that by measuring the bushing temperature it is possible to determine an abnormal lubrication thereof, in particular the temperature of the lubricant increases as the temperature of the bushing increases.

Application US 2013/0255354 discloses a monitoring device in an undercarriage assembly which has a roller assembly including a shaft and a bushing. In one example, the monitoring device has a temperature sensor located inside the roller assembly to measure the temperature of the bushing. In particular, an opening is provided in the shaft which is formed parallel to the shaft, until a depth sufficient to overlap the bushing, and having a portion oriented outwardly which reaches the outer surface of the shaft. The temperature sensor is inserted into the opening and is arranged in the portion oriented towards the shaft surface. The document mentions that output signals are transferred through a wireless transmitter to a computer or the data are accessed through a port that connects to the monitoring device.

The Applicant has observed that an opening in the shaft reaching the outer surface of the shaft can allow positioning a temperature sensor in direct contact or substantially in direct contact with the bushing, thus measuring efficiently the temperature of the latter.

The Applicant has however verified that such an opening may cause leakages of lubricant inside the opening with a potential double disadvantage of damaging the temperature sensor and of reducing the amount of lubricant available between the bushing and the shaft. This second event may even lead to a premature degradation of the roller assembly due to lack or shortage of lubricant.

The Applicant has noted that an indication of unsuitable lubrication of the bushing can be not only related to the temperature of the bushing but also to the temperature of shaft portions placed near the bushing.

The Applicant has observed that, by arranging a temperature transducer in the shaft of the roller assembly so that the transducer is near the bushing but not directly facing the bushing or in contact with the bushing, it is possible to measure a temperature which, though not exactly corresponding to the actual temperature, is proportional to the bushing temperature, allowing to identify abnormal increases in the bushing temperature.

SUMMARY

The present invention relates to a tracked undercarriage roller assembly comprising:
  a roller body having a through cavity delimited by a radially inner surface;
  a shaft inserted in the through cavity of the roller body;

a bushing which extends from a first axial end to a second axial end and radially interposed between the roller body and the shaft;

an annular chamber at least partially filled with lubricant and radially interposed between the shaft and the bushing;

a housing seat obtained in the shaft and comprising an inlet portion facing an axial end surface of the shaft and a measuring portion placed inside the shaft in an axial position between the first axial end and the second axial end of the bushing, wherein the inlet portion and the measuring portion are aligned with each other along an axial direction; a temperature transducer located inside the housing seat at the measuring portion;

wherein the measuring portion is placed at a radial distance from the bushing between 8 millimetres and 50 millimetres.

Arranging the housing seat in the shaft and inserting the temperature transducer inside the measuring portion of the housing seat makes it possible to detect the temperature of the shaft at the measuring portion of the housing seat.

Since, as known, the shaft of a tracked undercarriage roller assembly is typically made of a ferrous alloy, such as steel, the shaft has such a thermal conductivity as to allow portions of the shaft placed near the bushing to change temperature as the temperature of the bushing changes.

The Applicant has observed that, depending on the size of the roller assembly and on the material actually used to manufacture the shaft, a radial distance of the temperature between 8 millimetres and 50 millimetres from the bushing allows to detect sudden or abnormal increases in the bushing temperature.

An increase in the temperature detected by the temperature transducer beyond a predetermined threshold can be associated to an abnormal increase in the temperature of the bushing, due, for instance to the leakage of lubricant from the annular chamber, a too high friction of the bushing on the shaft or in any case to an out of scope bushing functioning.

It is thereby possible to intervene on the roller assembly restoring its functions before an irreversible damage on the roller assembly occurs.

Furthermore, by arranging the inlet portion facing an axial end surface of the shaft with the inlet portion and the measuring portion aligned between them along an axial direction, it is possible to prevent lubricant leakages from the annular chamber towards the housing seat or towards the temperature transducer, as the housing seat is completely obtained inside the shaft without having openings facing the bushing.

The lubricant can be for instance lubricant oil or grease.

The terms "axial", "axially", "radial" and "radially", are used with reference to a rotation axis of the roller assembly.

In particular, the terms "axial" and "axially" mean references/quantities arranged/measured or extending in a direction parallel or coincident with the rotation axis of the roller assembly.

The terms "radial" and "radially" mean references/quantities arranged/measured or extending in a direction perpendicular to the rotation axis of the roller assembly.

The terms "radially inner" and "radially outer" mean respectively a position closer to or further away from the aforementioned rotation axis.

The terms "axially inner/outer" mean respectively a position closer to and further away from a point of the roller assembly placed along the rotation axis and equally spaced apart from shaft axial ends.

The term "transducer" means a device which interacts directly with the measured quantity, that is to say the first element of a measurement chain that converts a physical quantity into an electric signal related to the measured quantity.

Preferably, the measuring portion is placed at a radial distance from the bushing between 10 millimetres and 40 millimetres, still more preferably between 12 and 30 millimetres, for instance about 15 millimetres.

Preferably, the housing seat is an axial-symmetry blind cavity with a symmetry axis parallel to an axial direction.

Thereby, the housing seat can be obtained by piercing the shaft until the desired depth for inserting the temperature transducer inside the shaft is reached.

Preferably, the blind cavity has a rectilinear extension and does not comprise deviations or branches radially branching from the symmetry axis parallel to an axial direction.

This prevents the housing seat from reaching a radially outer surface of the shaft or facing directly to the bushing or the annular chamber containing lubricant, avoiding possible leakages of lubricant from the annular chamber.

Preferably, the inlet portion has an extension in radial direction greater than the extension in the radial direction of the measuring portion.

Preferably, the inlet portion has an extension in radial direction which is almost double the extension in the radial direction of the measuring portion.

Preferably, an electronic sensor module is provided configured to generate measurement signals in wireless mode including data representative of temperature; the electronic sensor module being placed in the inlet portion of the housing seat.

Preferably, the electronic sensor module comprises: circuit components, an electronic processor, a power supply source, and a wireless transmitter operatively connected to the electronic processor so as to receive respective measurement signals including data representative of temperature, the wireless transmitter generating corresponding measurement signals in wireless mode that include data representative of temperature.

Preferably, the electronic processor of the electronic sensor module is configured to receive measurement signals from the temperature transducer.

Thereby, for example, an operator who is far from the tracked vehicle incorporating the roller assembly will be able to remotely view data related to the current temperature of the shaft portion near the bushing connecting a mobile terminal or a PC to a WI-FI network which the electronic sensor module is connected to.

Preferably, the inlet portion comprises an annular groove engaged by a stop ring, the annular groove being axially external to the electronic sensor module so that the electronic sensor module is axially retained in the inlet portion by the stop ring.

The electronic sensor module is thereby retained inside the housing seat avoiding possible damages to the electronic sensor module while the roller assembly is being used and ensuring proper functioning thereof.

Preferably, a closing plug is provided for the inlet portion of the housing seat. The closing plug is preferably axially interposed between the stop ring and the electronic sensor module.

The closing plug prevents liquids, mud, dirt or other from entering into the housing seat.

Preferably, the stop ring is removable from the annular groove in the inlet portion of the housing seat.

The stop ring holds the plug in the operative position however allowing for removal thereof in case access inside the housing seat is required for an inspection or replacement of the temperature transducer and/or of the electronic sensor module.

Preferably, the temperature transducer is connected to the electronic sensor module by electric wires.

Preferably, the temperature transducer is a thermistor with a resistance decreasing as the temperature increases.

As the temperature of the shaft portion near the bushing increases, the resistance value of the thermistor decreases. Thereby, in case of a thermistor malfunction (such as in case of electrical breakdown between thermistor and electronic sensor module), the resistance value detected would be significantly misaligned from an expected resistance value, providing immediate indication of a thermistor malfunction.

Preferably, a pin inserted into a radial cavity of the shaft is provided to make the shaft integral with an undercarriage frame; the housing seat not crossing the radial cavity of the shaft.

The pin has the task of engaging the shaft to the undercarriage frame (or to an undercarriage component integral with the undercarriage frame) to keep the roller assembly in position and to allow the roller body to rotate about the shaft.

The pin is typically removable so as to remove the roller assembly from the undercarriage carriage.

In case the temperature transducer is connected to the electronic sensor module with electric wires and in case the housing seat crosses the pin, the removal of the pin would permanently damage the connection between the temperature transducer and the electronic sensor module, as the pin would be crossed by electrical connections. Furthermore, by preventing the housing seat from crossing the pin, the positioning of the temperature transducer inside the housing seat may be carried out even when the roller assembly has not been yet mounted on the undercarriage frame.

Preferably, the roller body comprises an opening which puts in fluid communication the outer environment with the annular chamber filled with lubricant; the opening being closed by a plug.

BRIEF DESCRIPTION OF THE DRAWINGS

Further characteristics and advantages of the invention will be more evident from the following description of a preferred embodiment thereof, made with reference to the appended drawings. In such drawings.

DETAILED DESCRIPTION

Figure 1:
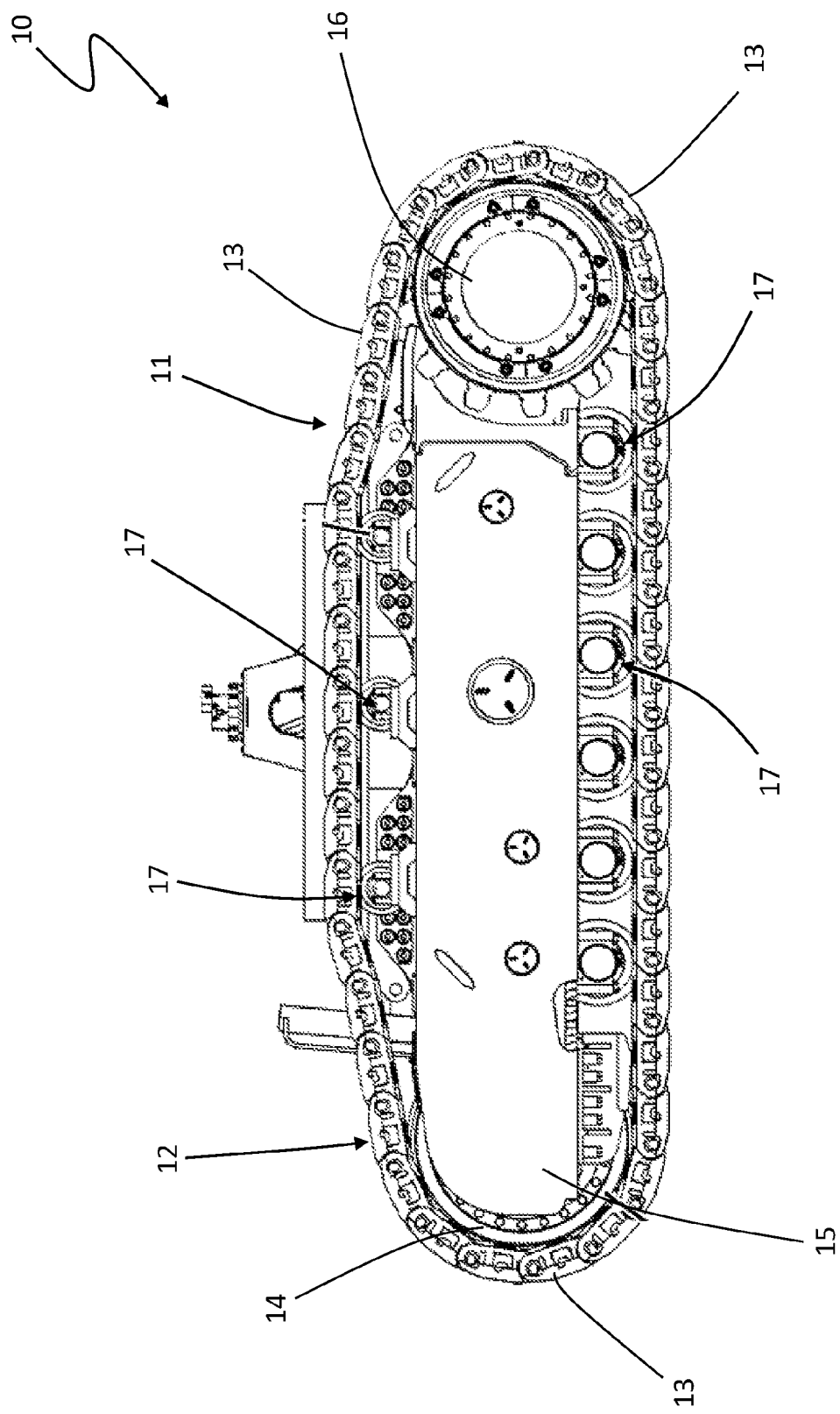
FIG. 1 is a schematic side view of a tracked undercarriage.

FIG. 1 is a schematic side view showing some components of a tracked undercarriage. The tracked undercarriage 10 comprises two track assemblies 11, of which only one is visible in FIG. 1. Each track assembly 11 comprises a chain 12, comprising a plurality of links 13 interconnected between them by pins and bushings (not shown), a return wheel 14, in the figure partially hidden by a crankcase 15, and a driving wheel 16. A plurality of roller assemblies 17 is arranged between the return wheel 14 and the driving wheel 16, in particular one or more upper roller assemblies and a plurality of lower roller assemblies arranged in contact with the links 13 and adapted to guide the chain 12 in its motion.

The lower roller assemblies 17 are arranged in the lower portion of the track assembly 11 and are configured to transfer loads between the track and an undercarriage frame (not shown). The upper roller assemblies 17 are configured to guide the chain between the driving wheel 16 and the return wheel 14 and typically are present in a lower number than the number of the lower roller assemblies. The number of the lower roller assemblies 17 varies depending on the type of machine and the weight thereof.

According to the present disclosure, at least a lower or upper roller assembly 17 includes a sensor device for monitoring the temperature.

Figure 2A:
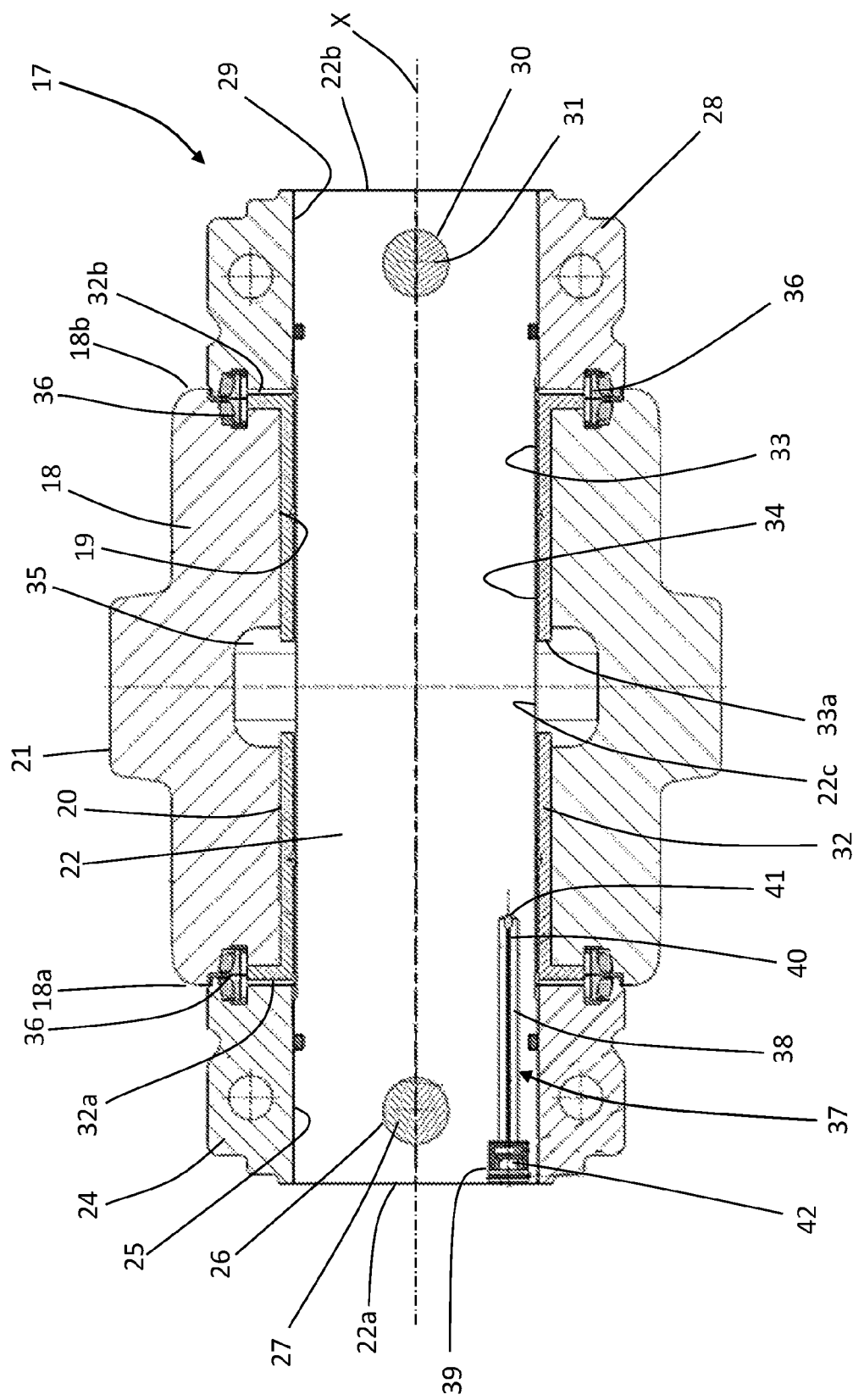
FIG. 2A is a section view of a tracked undercarriage roller assembly according to the present invention.

FIG. 2A is a section view of a roller assembly 17 according to an embodiment. In this embodiment the roller assembly 17 is a roller assembly of a lower roller. The section plane is a longitudinal plane transversal to the links 13 of the chain 11, and hence to the direction of movement of the tracked undercarriage, passing through the rotation axis X of the roller assembly 17.

The roller assembly 17 comprises a roller body 18 comprising a cylindrical through cavity 19 which extends from one first axial end 18a to a second axial end 18b of the roller body 18.

The roller body 18 is delimited by a radially inner surface 20 usually having a cylinder shape facing the cylindrical cavity 19 and a radially outer surface 21 whose shape is determined by the type of track with which the roller assembly 17 must interact.

The roller body 18 is made of a low-alloy steel that is boron-alloyed and submitted to at least a heat treatment. A low-alloy steel is a steel wherein other elements other than iron and carbon are present and wherein none of such other elements is present in an amount higher than 5%.

The roller assembly 17 further comprises a shaft 22 inserted into the cylindrical cavity 19 of the roller body 18. The shaft substantially has a cylindrical shape, it extends between a first axial end 22a and a second axial end 22b and has a radially outer surface 22c facing the radially inner surface 20 of the roller body 18.

The shaft 22 is preferably made of a low-alloy steel that is boron alloyed and submitted to at least a heat treatment.

The shaft 22 has a greater extension in an axial direction than the extension in an axial direction of the roller body 18. In other words, the distance in the axial direction between the first axial end 22a and the second axial end 22b of the shaft 22 is greater than the distance measured along the same direction between the first axial end 18a and the second axial end 18b of the roller body 18.

The shaft 22 extends axially beyond the first 18a and the second axial end 18b of the roller body 18. In particular, the shaft extension in axial direction beyond the first axial end 18a of the roller body 18 is substantially equal to the extension in axial direction of the shaft 22 beyond the second axial end 18b of the roller body 18, as shown in FIG. 2A.

The shaft portion 22 which extends in an axially outer direction from the first axial end 18a of the roller body 18 is made integral with the undercarriage frame or with an undercarriage component integral with the undercarriage frame.

For this purpose a support 24 is provided that is made integral with the undercarriage frame or with an undercarriage component integral with the undercarriage frame provided with an inner through cavity 25 in which the shaft portion 22 is inserted extending in an axial outer direction from the first axial end 18a of the roller body 18, as shown in FIG. 2A.

To make the shaft 22 integral with the support 24, the shaft 22 comprises a radial cavity 26 which crosses the shaft 22 in a radial direction. On the support 24 two radially opposite through holes are formed which can be aligned between them and aligned to the radial cavity 26 of the shaft 22. A pin 27 is inserted in the radial cavity 26 so as to cross the radial cavity 26 and intercept the two through holes of the support 24. Thereby, any axial movement and any rotation about the rotation axis X of the shaft 22 relative to the support 24 is prevented.

Similarly, the shaft portion 22 which extends in an axial outer direction from the second axial end 18b of the roller body 18 is made integral with the undercarriage frame or with an undercarriage component integral with the undercarriage frame.

For this purpose a further support 28 is provided that is made integral with the undercarriage frame or with an undercarriage component integral with the undercarriage frame provided with an inner through cavity 29 in which the shaft portion 22 is inserted that extends in an axial outer direction from the second axial end 18b of the roller body 18, as shown in FIG. 2A.

To make the shaft 22 integral with the further support 28, the shaft 22 comprises a radial cavity 30 which crosses the shaft 22 in a radial direction. On the further support 28 two radially opposite through holes are formed which can be aligned between them and aligned to the radial cavity 30 of the shaft 22. A further pin 31 is inserted in the radial cavity 30 in such a way that it crosses the radial cavity 30 and intercepts the two through holes of the support 28. Thereby, any axial movement and any rotation about the rotation axis X of the shaft 22 relative to the further support 28 is prevented.

The roller body 18 is rotatable with respect to the shaft 22 about the rotation axis X. In order to reduce the friction between the roller body 18 and the shaft 22 a bushing 32 is provided that is radially interposed between the roller body 18 and the shaft 22, as shown in FIG. 2A.

The bushing 32 is made of brass, bronze, copper or other preferably metal material that is more ductile than the material used to make the shaft 22 and the roller body 18. The bushing material 32 also has a good thermal conductivity coefficient, for instance higher than 15 W/m° C.

In the preferred embodiment of the invention, the bushing 32 is integral in rotation with the roller body 18 and thus rotates with respect to the shaft 22.

As shown in FIG. 2A, the bushing 32 extends throughout the axial extension of the roller body 18 between one first axial end 32a and one second axial end 32b. The bushing 32 comprises a radially inner surface 33 facing directly the shaft 22. Between the radially inner surface 33 of the bushing 32 and the radially outer surface 22c of the shaft 22 an annular chamber is defined 34 which is filled with a lubricant, such as oil or grease, to further reduce friction between the shaft 22 and the bushing 32.

The annular shaft 34 is in fluid communication with a tank 35 obtained in the roller body 18 through one or more passage radial holes 33a obtained in the bushing 33. The tank 35 also has an annular shape and is in fluid communication with a channel (not shown) obtained in the roller body 18 which extends radially between the tank 35 and the radially outer surface 21 of the roller body 18. The channel has the purpose of allowing introducing the lubricant into the tank 35 and thus into the annular chamber 34. The channel is closed by a leak proof plug (nor shown).

At the first 18a and second annular end 18b of the roller body 18 respective hydraulic sealing rings 36 are arranged to avoid lubricant leakages between the bushing 33 and the supports 24, 28 of the shaft 22. At the two portions of shaft 22 which extend in an axial outer direction from the first 18a and second axial end 18b of the roller body 18, they are further provided respective hydraulic sealing gaskets placed between the shaft 22 and the supports 24, 28 to avoid lubricant leakages between the shaft 22 and the supports 24, 28.

A housing seat 37 is obtained inside the shaft 22 that is defined by a blind cavity 38 in the shaft 22. The blind cavity 38 has an axial symmetry with a symmetry axis parallel to the rotation axis X.

The housing seat 37 extends along an axial direction deep down in the shaft from an inlet portion 39 to a measuring portion 40. The inlet portion 39 is placed at an axial end surface 22d of the shaft 22 placed in the first axial end 22a of the shaft 22. The inlet portion 39 is open such to define an opening for the cavity 38.

The measuring portion 40 is placed deep down inside the shaft 22, in particular it is placed axially at the bushing 32. As shown in FIG. 2A, the measuring portion 40 is placed axially between the first 32a and the second axial end 32b of the bushing 32.

The inlet portion 39 and the measuring portion 40 are aligned along an axial direction such that the blind cavity 38 is parallel to the rotation axis X.

The measuring portion 40 is spaced in a radial direction from the radially outer surface 22c of the shaft 22. The measuring portion 40 does not contact and is not open on the radially outer surface 22c of the shaft 22.

Figure 2B:
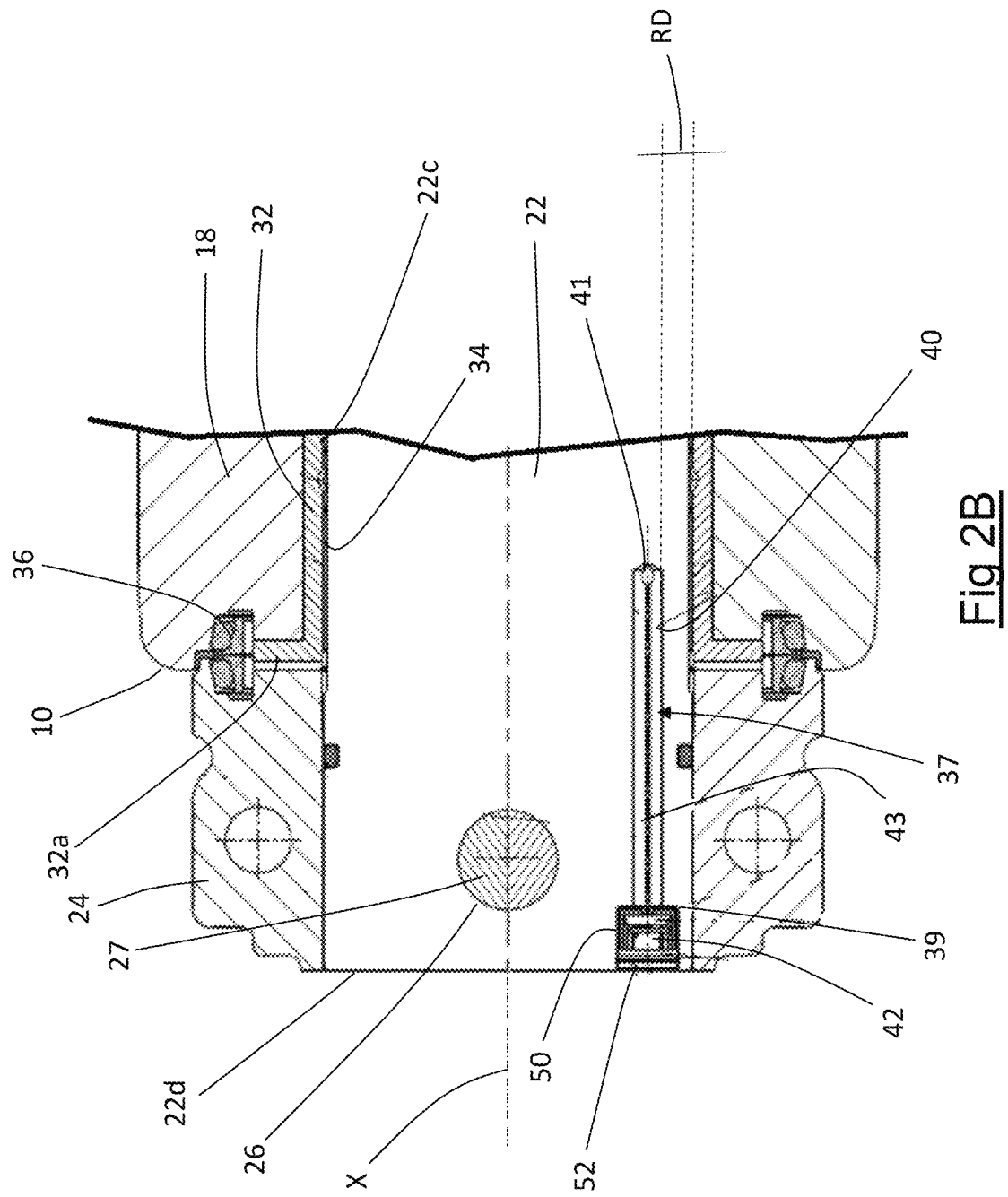
FIG. 2B is an enlargement of some details of the roller assembly of FIG. 2A.

As better shown in FIG. 2B, the measuring portion 40 is placed at a radial distance RD from the bushing 32 between 8 millimetres and 50 millimetres.

The radial distance RD is measured in a radial direction between the point of the inner cavity 38 that is radially closer to the bushing 32 and the radially inner surface 33 of the bushing 32, as shown in FIG. 2B.

Inside the measuring portion 40 of the housing seat 37 a temperature transducer 41 is inserted.

The temperature transducer 41 is configured to generate an electric signal representative of the measured temperature. For example, the temperature transducer 41 is a thermal probe, preferably an NTC (Negative Temperature Coefficient) probe having a negative temperature coefficient which causes a decrease in electrical resistance as the temperature increases. Preferably, the temperature transducer 41 is adapted to measure temperatures until about 200° C.

In the inlet portion 39 there is arranged an electronic sensor module 42 configured to generate measuring signals in wireless mode which include data representative of a temperature measured by the temperature transducer 41.

As better shown in FIG. 2B, the inlet portion 39 has an extension in the radial direction that is greater than the extension in the radial direction of the measuring portion 40, so as to house the electronic sensor mode 42.

In the preferred embodiment of the invention, the extension in radial direction of the inlet portion 39 is about double the radial direction extension of the measuring portion 40.

The extension in axial direction of the inlet portion 39 is selected so as to substantially house by fitting the electronic sensor module 42.

The electronic sensor module 42 and the temperature transducer 41 are electrically connected between them by electric wires 43.

Figure 4:
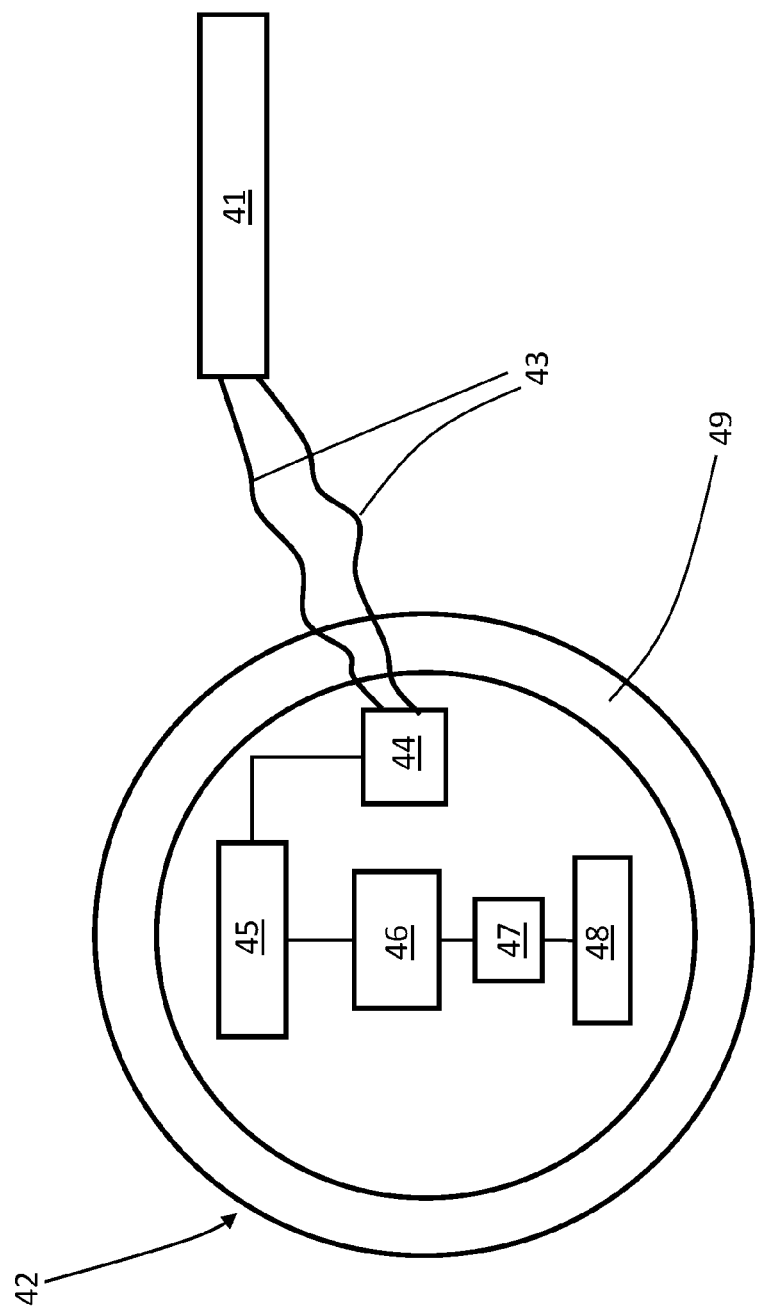
FIG. 4 is a schematic view of some components of the roller assembly of FIG. 2A.

As schematically shown in FIG. 4, the electronic sensor module 42 comprises a connector 44 for the connection with electric wires 43.

The sensor electronic module 42 comprises circuit components 45 operatively connected to electric wires 43 to capture signals from the temperature transducer 41 and generate output electric signals representative of the measured temperature.

The circuit components 45 of the electronic sensor module 42 comprise circuit components for the management of the signals from the temperature transducer 41, which can comprise a conditioning circuit for the analogue signals from the temperature transducer 41 and a possible amplifier for converting the input signals into a voltage or current, analogue or digital output signal. Typically, the electric signals output from the circuit components are digital electric signals. For this purpose, the circuit components 45 may comprise an analogue-to-digital A/D signal converter. The electric signals output from the first circuit components include data representative of the instantaneous temperature measured by the temperature transducer 41 in the shaft 22.

The electronic sensor module 42 comprises an electronic processor 46, in particular a microprocessor, associated with a memory which receives the measurement signals coming from the circuit components 45 and stores them to later send them to a wireless transmitter 47 for the transmission in wireless mode of measurement signals via an antenna 48.

The wireless transmitter 47 is configured to generate radio frequency signals. In particular, the wireless transmitter 47 is a radio frequency transmitter configured to receive, from the processor 46, measurement signals which include data representative of temperature and to generate respective radio frequency (RF) signals which include representative data of temperature. The wireless transmitter 47 is operatively connected to an antenna 48 for transmitting RF signals.

The electronic sensor module 42 further comprises a supply source 49, such as a button battery, to supply the circuit components 45 and the microprocessor 46.

Figure 3:
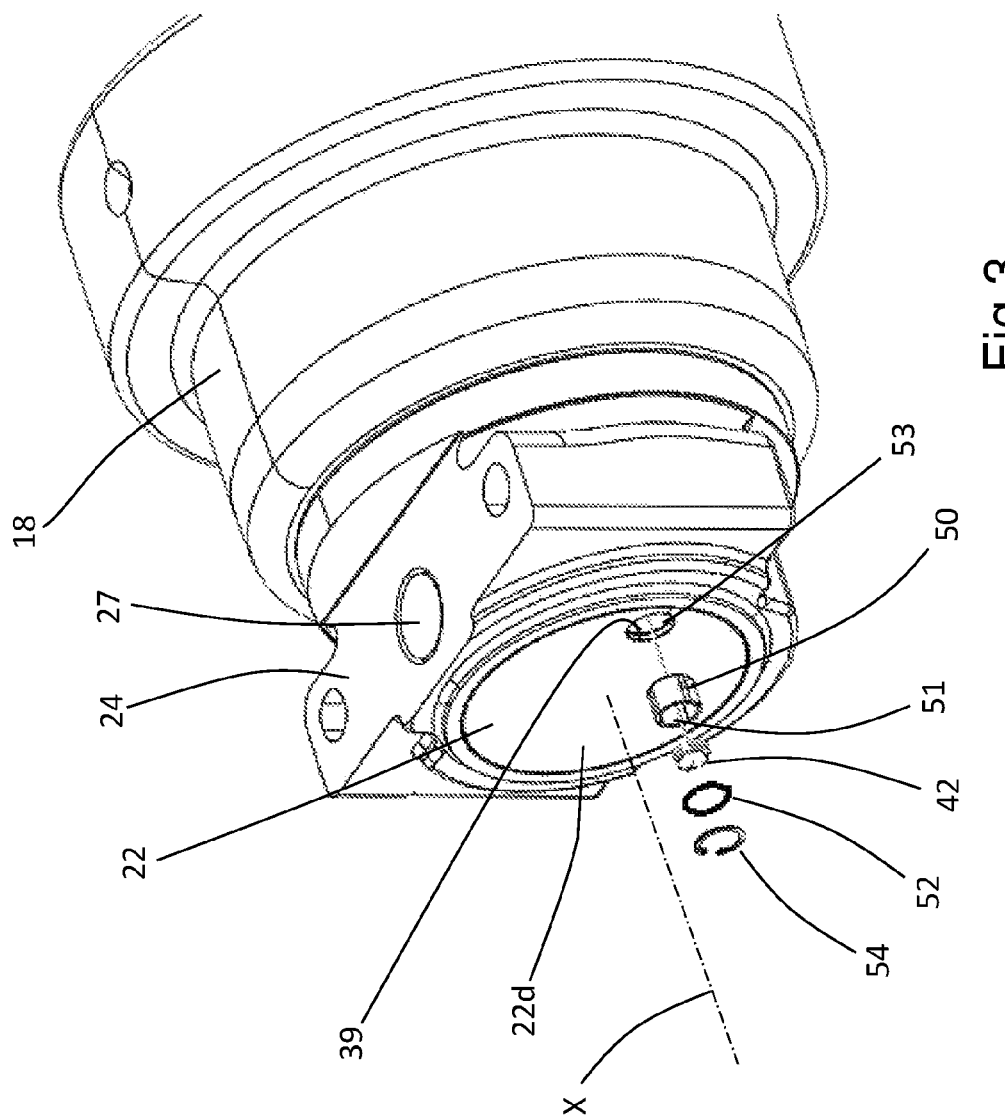
FIG. 3 is a partially exploded perspective view of a detail of the roller assembly of FIG. 2A.

Preferably, the electronic sensor module 42 is inserted in a container 50 arranged inside the inlet portion 39 of the housing seat 37, as shown in FIG. 2B. The container 50 ensures a greater protection of the circuit components and electronic devices included in the electronic sensor module 42. In the preferred embodiment, the container 50 is a synthetic rubber case capable of absorbing vibrations with a front opening 51 which faces the axially outer surface 22d of the shaft 22 (FIG. 3). The container 50 can be filled with an epoxy resin to further dampen external stresses and make the electronic sensor module 42 leak-tight.

The container 50 is closed by a closing plug 52 which closes, preferably tightly, the front opening 51 and which fits in the inlet portion 39 of the housing seat 37, so as to seal the blind cavity 38. The closing plug 52 is made of a material that is transparent to the passage of radio signals transmitted via the antenna 48. The closing plug 52 is axially external to the electronic sensor module 42. The closing plug 52 is axially external to the container 50.

The inlet portion 39 of the housing seat 37 comprises an annular groove 53 obtained in the blind cavity 38 and placed at the surface 22d of axial end 22a of the shaft 22. The annular groove 53 is configured to receive and retain a stop ring 54. The stop ring 54 is a ring preferably made of steel and elastic, wherein elasticity is given by the fact that the outer circumference of the ring is not complete. The stop ring 54 is axially external to the electronic sensor module 42. The stop ring 54 is axially external to the closing plug 52. The stop ring 54 is axially external to the container 50.

Starting from an axially outer position to an axially inner position, the stop ring 54 is provided as fitted in the annular groove 53 (which is placed in the same axial position of the stop ring 54), followed by the closing plug 52 followed by the electronic sensor module 42 contained in the container 50.

The housing seat 37 extends in a radial direction so as to house the stop ring 54, the closing plug 52 and the container 50.

As shown in FIGS. 2A and 2B, the housing seat 37 does not intercept, i.e. does not cross, the radial cavity 26 which crosses the shaft 22 in a radial direction and which houses the pin 27. The blind cavity 38 is not in fluid communication and does not cross the radial cavity 26 which crosses in a radial direction the shaft 22 and which houses the pin 27.

The person skilled in the art will recognize that it is possible to combine the various characteristics of the embodiments described above to obtain further embodiments, all falling within the scope of the present invention as defined by the subsequent claims.

The invention claimed is:

1. A tracked undercarriage roller assembly comprising:
    a roller body having a through cavity delimited by a radially inner surface;
    a shaft inserted in the through cavity of the roller body;
    a bushing, which develops from a first axial end to a second axial end and radially interposed between the roller body and the shaft;
    an annular chamber at least partially filled with lubricant radially interposed between the shaft and the bushing;
    a housing seat obtained in the shaft and comprising an inlet portion at an axial end surface of the shaft and a measuring portion placed inside the shaft in an axial position between the first axial end and the second axial end of the bushing, wherein the inlet portion and the measuring portion are aligned with each other along an axial direction;
    a temperature transducer located inside the housing seat at the measuring portion; and
    a pin inserted in a radial cavity of the shaft to make the shaft integral with an undercarriage chassis, the housing seat not crossing the radial cavity of the shaft;
    wherein the measuring portion is placed at a radial distance from the bushing between 8 millimetres and 50 millimetres.

2. The roller assembly according to claim 1, wherein the housing seat is an axially symmetrical blind cavity with an axis of symmetry parallel to an axial direction.

3. The roller assembly according to claim 1, wherein the inlet portion has an extension in radial direction greater than the extension in the radial direction of the measuring portion.

4. The roller assembly according to claim 1, wherein the temperature transducer is a thermistor with resistance, which decreases with increasing temperature.

5. The roller assembly according to claim 1, comprising an electronic sensor module configured to output measurement signals in wireless mode, which include data representative of temperature; the electronic sensor module being placed in the inlet portion of the housing seat.

6. The roller assembly according to claim 5, wherein the temperature transducer is connected to the electronic sensor module through electric wires.

7. The roller assembly according to claim 5, wherein the inlet portion comprises an annular groove engaged by a stop ring, the annular groove being axially external to the electronic sensor module in such a way that the electronic sensor module is axially retained in the inlet portion by the stop ring.

8. The roller assembly according to claim 7, comprising a closing plug for the inlet portion of the housing seat; the closing plug being axially interposed between the stop ring and the electronic sensor module.

9. A tracked undercarriage roller assembly comprising:
- a roller body having a through cavity delimited by a radially inner surface;
- a shaft inserted in the through cavity of the roller body;
- a bushing, which develops from a first axial end to a second axial end and radially interposed between the roller body and the shaft;
- an annular chamber at least partially filled with lubricant radially interposed between the shaft and the bushing;
- a housing seat obtained in the shaft and comprising an inlet portion at an axial end surface of the shaft and a measuring portion placed inside the shaft in an axial position between the first axial end and the second axial end of the bushing, wherein the inlet portion and the measuring portion are aligned with each other along an axial direction;
- a temperature transducer located inside the housing seat at the measuring portion; and
- an electronic sensor module configured to output measurement signals in wireless mode, which include data representative of temperature, the electronic sensor module being placed in the inlet portion of the housing seat;
- wherein the inlet portion comprises an annular groove engaged by a stop ring, the annular groove being axially external to the electronic sensor module in such a way that the electronic sensor module is axially retained in the inlet portion by the stop ring; and
- wherein the measuring portion is placed at a radial distance from the bushing between 8 millimetres and 50 millimetres.

10. The roller assembly according to claim 9, comprising a closing plug for the inlet portion of the housing seat; the closing plug being axially interposed between the stop ring and the electronic sensor module.

* * * * *